US006290176B1

(12) United States Patent
Hankinson et al.

(10) Patent No.: US 6,290,176 B1
(45) Date of Patent: Sep. 18, 2001

(54) AIRSHIP GONDOLA SUSPENSION SYSTEM AND METHOD OF MAKING SAME

(75) Inventors: John Hankinson, Elizabeth City, NC (US); John Bewley, Strensall (GB); Richard Hankinson, Elizabeth City, NC (US); George Spyrou, Greenwich, CT (US)

(73) Assignee: Airship Management Services, Inc., Greenwich, CT (US)

( * ) Notice: Subject to any disclaimer, the term of this patent is extended or adjusted under 35 U.S.C. 154(b) by 0 days.

(21) Appl. No.: 09/414,635

(22) Filed: Oct. 8, 1999

Related U.S. Application Data
(60) Provisional application No. 60/103,656, filed on Oct. 9, 1998.

(51) Int. Cl.[7] .................................. B64B 1/02; B64B 1/06
(52) U.S. Cl. ......................... 244/125; 244/126; 244/127; 244/30
(58) Field of Search .................................. 244/125, 127, 244/126, 30, 128

(56) References Cited

U.S. PATENT DOCUMENTS

| | | | | |
|---|---|---|---|---|
| 3,006,577 | * | 10/1961 | Schott | 244/127 |
| 4,052,026 | | 10/1977 | Wood | 244/127 |
| 4,365,772 | | 12/1982 | Ferguson | 244/33 |
| 4,934,631 | | 6/1990 | Birbas | 244/30 |
| 5,456,426 | * | 10/1995 | Wexler | 244/127 |

\* cited by examiner

*Primary Examiner*—Charles T. Jordan
*Assistant Examiner*—George L. Steele
(74) *Attorney, Agent, or Firm*—George T. Marcou; Kilpatrick Stockton LLP (57) ABSTRACT

The present invention describes a dual suspension catenary system which includes aspects of both an internal catenary system and an external catenary system. The dual suspension catenary system of the present invention retains and expands upon the advantages of the internal and external catenary systems, such as larger payload suspension and envelope integrity while decreasing the disadvantages (e.g., envelope breach and aesthetics).

22 Claims, 7 Drawing Sheets

AIRSHIP GONDOLA SUSPENSION SYSTEM AND METHOD OF MAKING SAME

CROSS-REFERENCE TO RELATED APPLICATIONS

This application claims the benefit of Provisional Application Ser. No. 60/103,656, filed on Oct. 9, 1998.

BACKGROUND OF THE INVENTION

1. Field of the Invention

The present invention relates to a system and method for attaching a payload-carrying gondola or car to a hull of non-rigid airships.

2. Description of Related Art

Airships remain a viable and relatively inexpensive means for performing a variety of useful functions. While currently not universally accepted as a mass transit means, airships do have the ability to accommodate passengers and are extremely useful for advertising purposes (e.g., sporting events) as well as for both military and civilian surveillance applications. In particular, certain airships have the ability to carry large antenna arrays within their hulls or envelopes (hereafter "envelopes"). This, coupled with the airship's ability to remain on station for days at a time (i.e., stay over the same area) makes an airship ideal for combat type surveillance applications. Further, airships have a relatively low radar signature, making them difficult to detect. Civilian surveillance applications include border patrol, drug smuggling operations, and other criminal applications.

One of the most critical features of an airship is the payload-carrying gondola or car (hereafter "car"). Of the three most common types of airships, rigid, semi-rigid, and non-rigid or blimp, the non-rigid airships provide the biggest challenge in the area of payload attachment. Unlike rigid and semi-rigid airships which have at least some type of an internal skeleton to which the payload might be attached, the non-rigid airships rely solely on an envelope and its gas contents for shape and structure. The payloads may be comprised of any or all of the following, including a cockpit, an engine, persons, and various other cargo or equipment.

Figure 3:
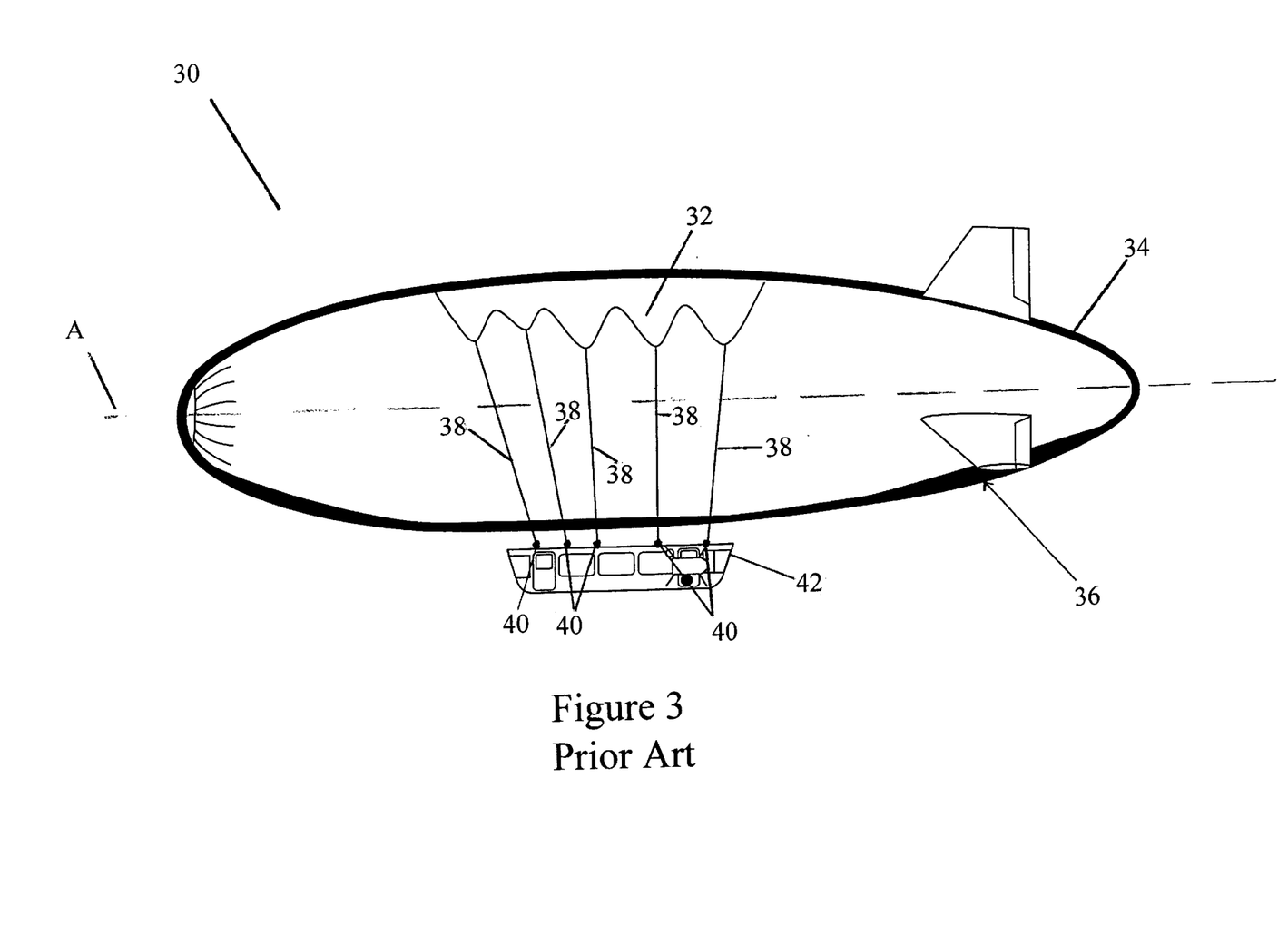
FIG. 3 is a conventional internal catenary system for securing a payload to an airship.

For larger volume airships (e.g., greater than 5000 cubic meters), the prior art teaches the use of an internal catenary system as shown in prior art FIG. 3. For ease of explanation, the envelope 30 has been divided by line A into upper and lower portions. The internal catenary system is basically an internal cable suspension system wherein two or four longitudinal load curtains 32 (only one shown) are attached to the internal upper surface 34 of an envelope 30. Attached to the lower edges of the load curtains 32 and extending downward through gas tight seals (not shown) in the lower envelope surface 36, is a cable system using either steel or nonmetallic Aramid™ cables 38. These cables 38 are tensioned and attached to strategic hard points 40 on the car structure 42. The load curtains 32 and cables 38 are geometrically designed so that the weight of the car payload is transferred by the suspension cables 38 to the envelope curtains 32 and is spread onto the envelope's upper surface 34 through the curtains 32.

The conventional internal catenary system is disadvantageous for a number of reasons. First, the conventional system requires several holes in the lower envelope skin to allow the suspension cables to pass through. These holes weaken the envelope's integrity and are possible sources of gas leaks. Second, the alignment of the suspension cables from the load curtains through the lower skin to their attachment points in the gondola is critical. Any misalignment is corrected by fitting cable fairleads which lead to high cable side-loads and possibly additional loads on the envelope. The ultimate cable life is severely reduced when a fairlead is used to correct a misalignment problem. Third, the internal cable system consists of a complex assembly of cables and pulleys which are installed inside the envelope prior to inflation with the lifting gas. This assembly is difficult to maintain and repair once the envelope is inflated. Fourth, the attachment of the gondola to the envelope is a complex process and requires suitable equipment to tension the catenary cables during the airship assembly. Finally, all of the gondola suspension loads are transferred through the upper load curtain/envelope interface. The various envelope breaches and excessive load concentrations inherent to conventional internal catenary systems place severe limitations on airship and payload size.

Figure 4:
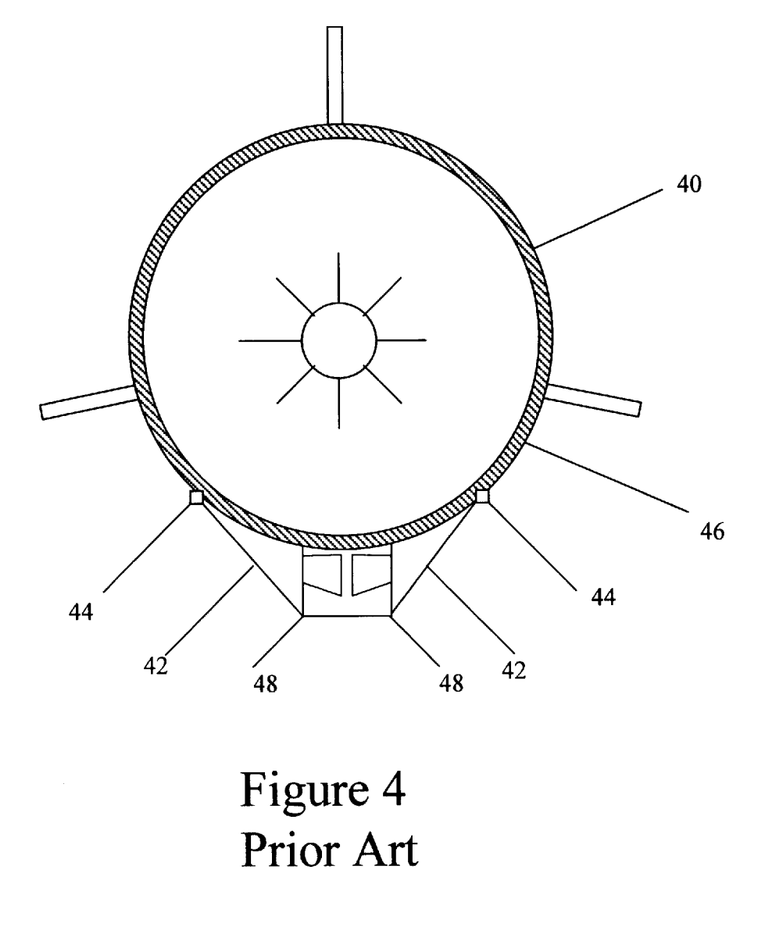
FIG. 4 is a conventional external catenary system for securing a payload to an airship.

For smaller airships, a conventional external catenary system is commonly used and employs a suspension system external to the envelope 40 as shown in FIG. 4. Cables 42 are attached tangentially to load patches 44 bonded to the outside envelope surface 46. The cables are tensioned and attached to the lower edges of the car/gondola 48. This method does not require any complex internal load curtain or suspension cable system and the pressure envelope integrity is not breached by cable suspension gaiters and load rings. But the conventional external catenary system has disadvantages of its own.

First and most importantly, the success of the conventional external catenary system has been limited to relatively small volume airships, carrying small payloads. Second, the external cables detract from the aesthetics of the airship, increase drag and can hinder ground crew personnel and passengers. For example, depending on where the external cables attach to the car, it may be difficult to access the cockpit or engine compartments for maintenance. Further, the cables might obstruct the view of passengers, limiting passenger enjoyment and, consequently, purchasing incentives.

A final conventional suspension system is the aerostat system which is used mainly for aerostats and airships with small payloads. The aerostat system employs a system similar to the external catenary, however, with these small payload applications the car is attached directly to the external skin of the envelope without additional cables. In this method the car or payload is attached to a number of fabric tabs bonded to the lower skin of the envelope. While this system is simplistic in its design and therefore advantageous in some situations, the system is severely limited by the payload that can be carried by the airship. Heavy payloads would produce large distortions in envelope shape, giving rise to local areas of high fabric stress.

BRIEF SUMMARY OF THE INVENTION

Consequently, an object of this invention is to minimize the disadvantages of the systems listed above, while maintaining and improving upon the conventional systems.

The embodiments of the present invention include a dual suspension catenary system which includes aspects of both an internal catenary system and an external catenary system. The dual suspension catenary system of the present invention retains and expands upon the advantages of the internal and external catenary systems such as larger payload suspension and envelope integrity while decreasing the disadvantages (e.g., envelope breach and aesthetics).

A first embodiment of the present invention is a system for suspending a payload from an airship. The major components of this system are a cable system comprising at least two cables, at least two upper load curtains fixed to an internal surface of an airship envelope, and at least one lower load curtain fixed to an internal surface of an airship envelope wherein the at least two cables connect the at least two upper load curtains to the at least one lower load curtain. Further in this first embodiment, there is at least one loop tab attached to the airship envelope and a frame fixed to the at least one loop tab for attaching the payload thereto.

A second embodiment of the present invention is a system for suspending a payload from an airship. The major components of this system include an internal cable system comprising at least two cables, at least two upper load curtains fixed to an internal surface of an airship envelope, and at least one lower load curtain fixed to an internal surface of an airship envelope wherein the at least two cables connect the at least two upper load curtains to the at least one lower load curtain. Further, this second embodiment includes at least one loop tab attached to the airship envelope through at least one slit in the airship envelope, the at least one loop tab being positioned adjacent to the points where the at least one lower load curtain attaches to the internal surface of the airship envelope. A frame is attached to the at least one loop tab for further attaching thereto the payload.

A third embodiment of the present invention is a method for suspending a payload from an airship. This method includes attaching at least two cables to an inside surface of an airship envelope surface via at least one upper and at least one lower internally fixed load curtains, attaching at least one loop tab to an airship envelope, attaching a frame to the at least one loop tab, and affixing the airship payload to the frame.

A fourth embodiment of the present invention is a payload suspension for an airship having an envelope. The envelope includes at least two upper load curtains attached to the top internal surface of the envelope, at least one lower load curtain attached to the bottom internal surface of the envelope, at least two cables attached between the at least two upper load curtains and the at least one lower load curtain, at least one loop tab fixed to the envelope, and a frame for carrying the payload attached to the at least one loop tab.

DETAILED DESCRIPTION OF THE INVENTION

Figure 1A:
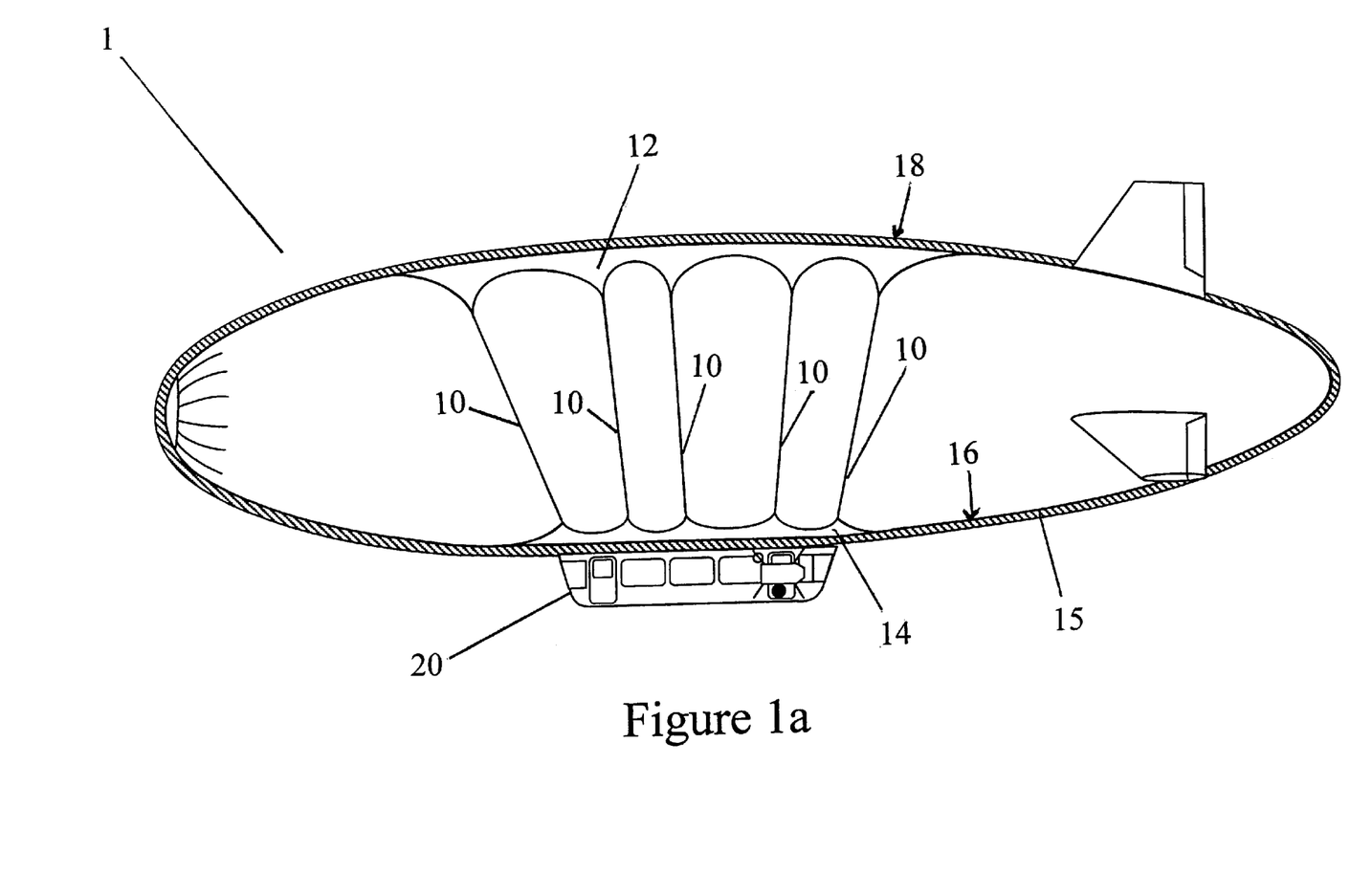
FIG. 1a is a cross-sectional sideview of an airship incorporating a suspension system according to an embodiment of the present invention.
Figure 1B:
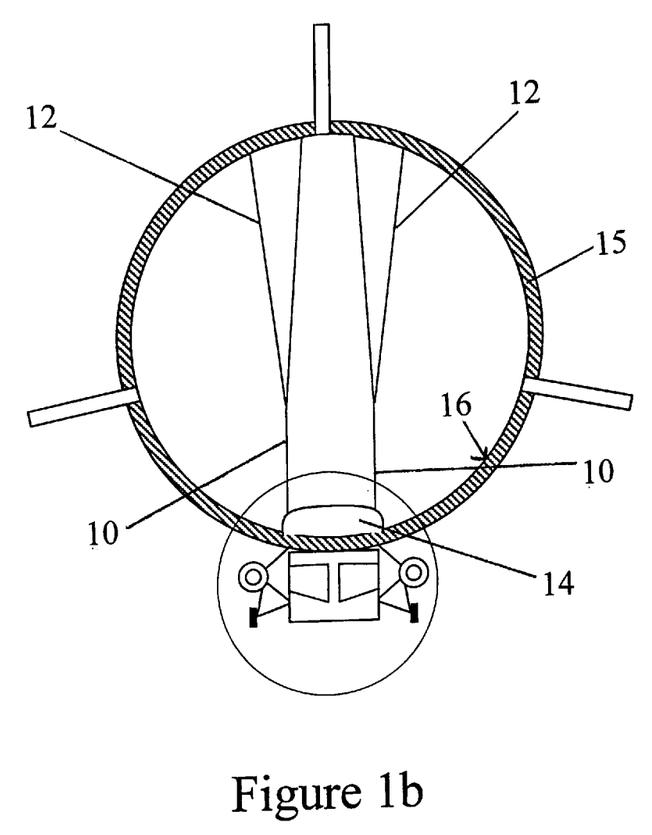
FIG. 1b is a frontview of an airship incorporating a suspension system according to an embodiment of the present invention.

Generally, the contemplated invention utilizes both an internal-type catenary system and an external-type catenary system to form a novel catenary system for suspending a payload carrying gondola or car (hereafter "car") from an airship 1 (See FIGS. 1a and 1b).

Referring to FIG. 1a, the system contemplated by the present invention includes an internal cable system comprised of at least two cables 10, at least two upper load curtains 12 (see FIG. 1b for curtains two through four) and at least one lower load curtain 14. The upper and lower load curtains are attached to the internal surface 16 of the envelope 15 of the airship 1 along the entire length of the curtain. There are numerous conventional methods for attaching the load curtains to the envelope including various types of bonding such as thermal and sonic. The cables do not pass through the external surface 18 of the envelope 15, thus reducing the possibility of gas leakage and the requirement for accurate alignment of cable gaiters and car attachment points. The car 20 is attached via loop tabs (discussed below) to the underside of the envelope 15, thus retaining all of the advantages of an aerostat system but allowing the airship to suspend a larger payload capacity like the conventional internal catenary system. The envelope 15 is comprised of at least one layer of any suitable, lightweight material, examples of which are Dacron® material, polyester material, Mylar® material, and Tedlar® material bonded with Hytrel® material. These suitable materials are obviously non-permeable to gas and offer enhanced envelope lift characteristics.

Referring to FIG. 1b in a preferred embodiment of the invention, the internal surface 16 of the envelope 15 has at least two upper load curtains 12 and at least one lower load curtain 14 longitudinally attached thereto. The respective upper and lower load curtains are connected by at least two tensioned cables 10 at various locations along their length (see FIG. 1a) via conventional methods of attachment. The cables are of fixed length calculated to give the correct tensions once the envelope 15 is at its normal operating pressure and are installed prior to gas inflation. Methods for calculating appropriate airship cable lengths and tensions are well known to those skilled in the art.

Figure 2A:
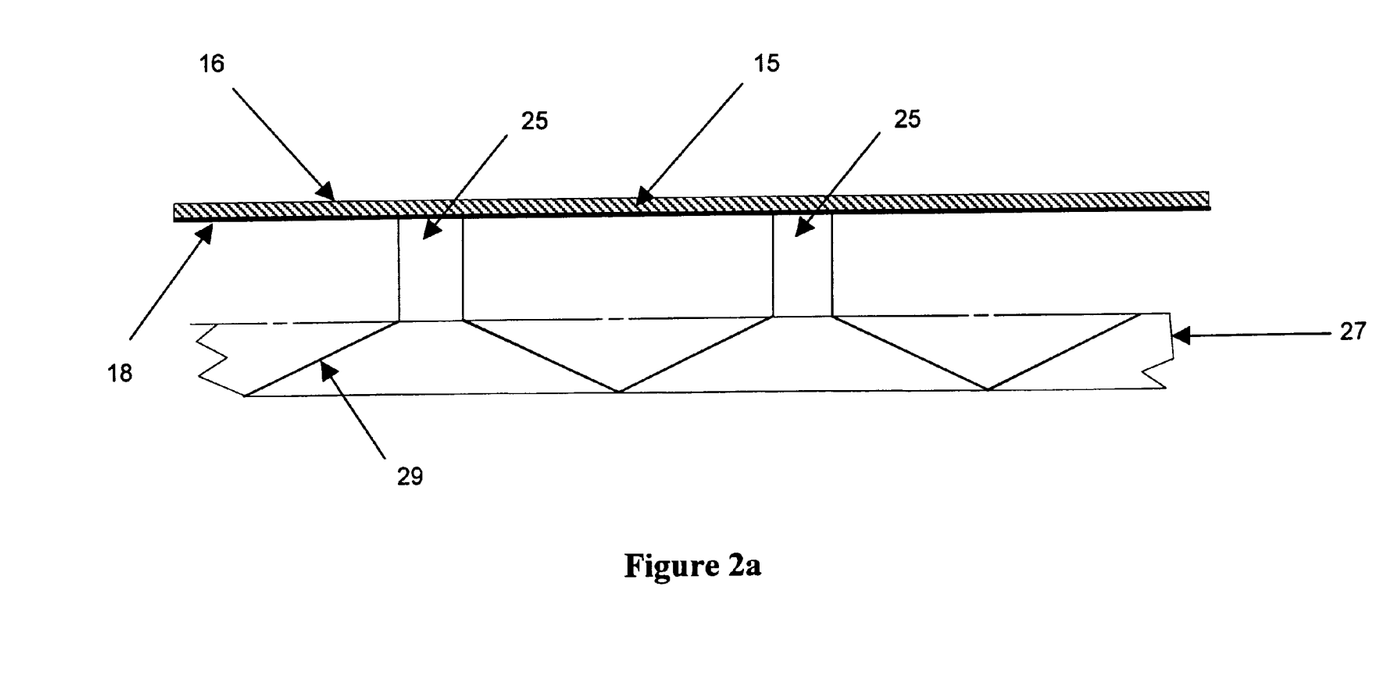
FIG. 2a is a detailed sideview of the external portion of a suspension system according to an embodiment of the present invention.

FIG. 2a illustrates the external catenary portion of the hybrid suspension system contemplated by the invention. The car is attached to the external surface 18 of the envelope 15. Adjacent to points where the at least one lower load curtain 14 is attached to the internal envelope surface 16 is a series of loop tabs 25 fixed to the internal surface 16 of the envelope 15 (see FIGS. 2b and 2c). The more numerous and evenly distributed the loop tabs are, the more evenly the weight of the payload is distributed, thus increasing the efficiency of the airship and the amount of payload that the airship is able to sustain.

Figure 2B:
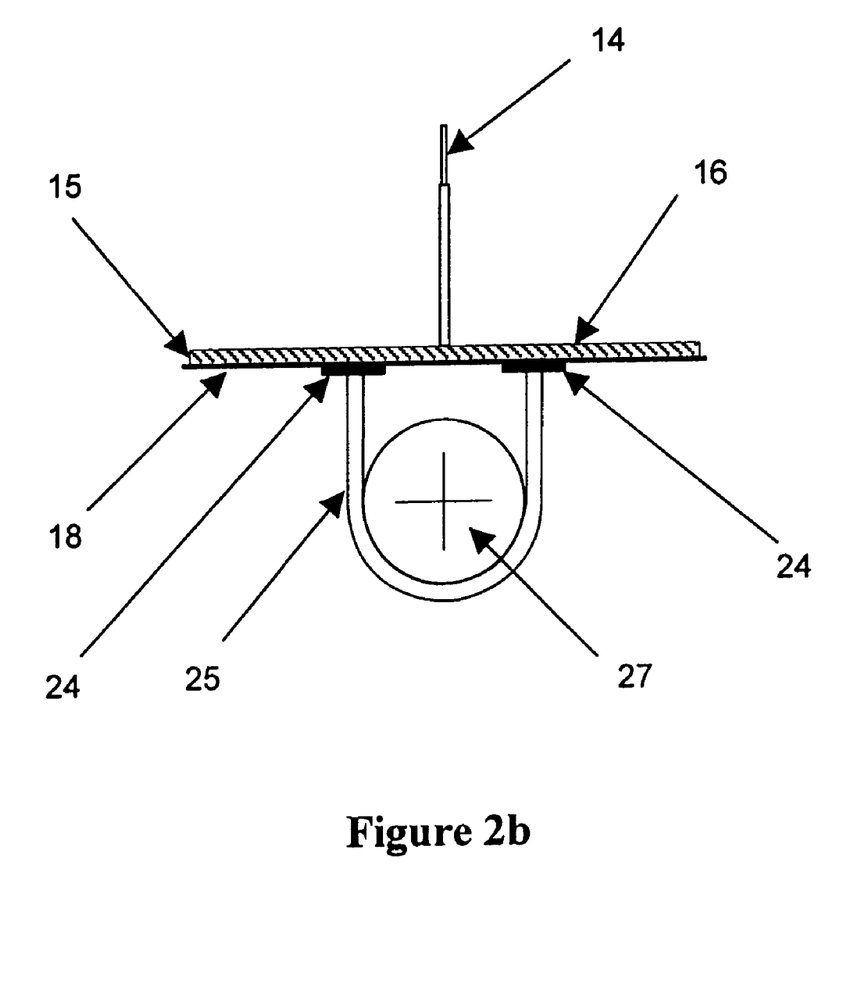
FIG. 2b is a detailed frontview of a first embodiment of a loop tab attachment system according to an embodiment of the present invention.

Referring to FIG. 2b, a first simplified embodiment for attaching the loop tabs 25 includes feeding the ends of the loop tabs through a pair of slits (not shown) in the external 18 and internal 16 surfaces of the envelope 15 and bonding the ends to the internal surface 16. Further, reinforcing patches 24 are bonded at each loop tab location to locally reinforce the envelope at the slit locations.

Figure 2C:
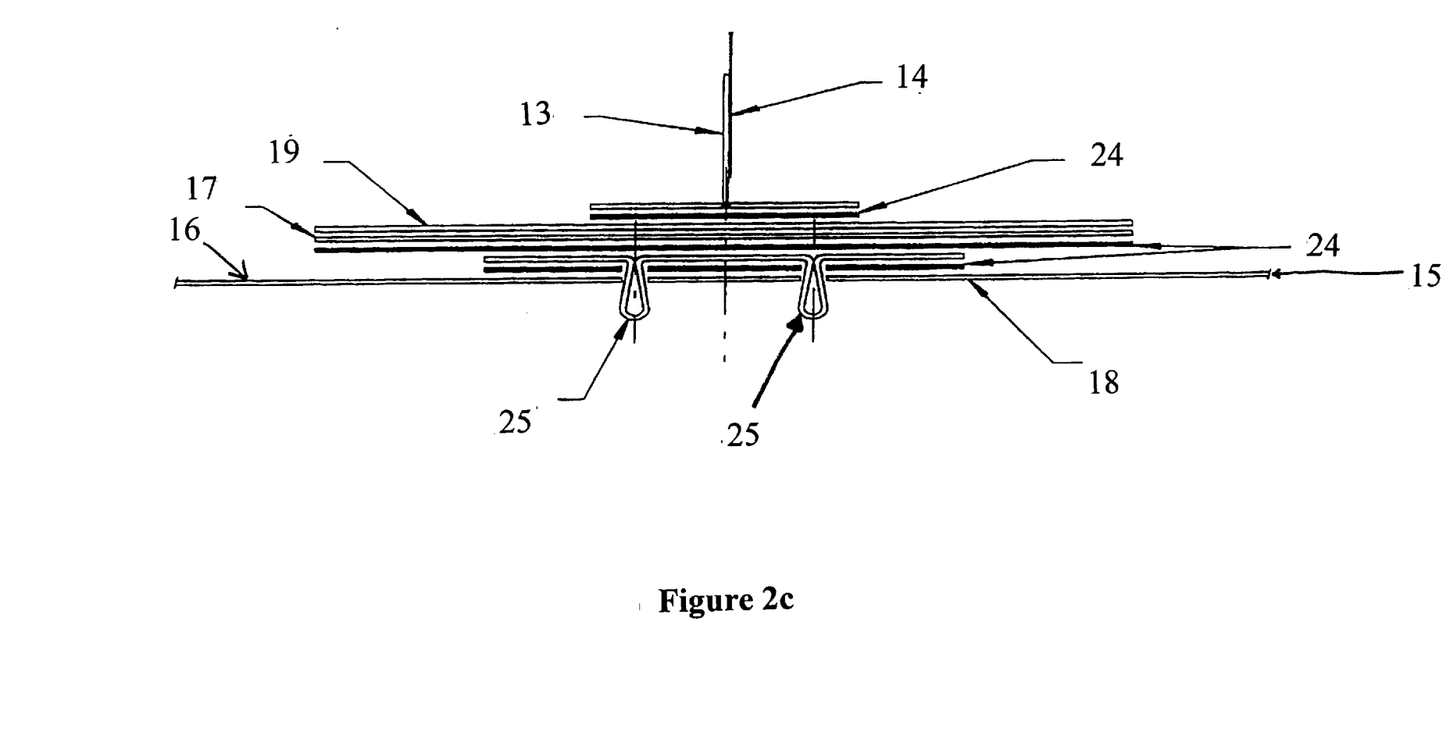
FIG. 2c is a detailed frontview of a second embodiment of a loop tab attachment system according to an embodiment of the present invention.

FIG. 2c represents a second embodiment for attaching loop tabs 25 wherein there are multiple layers of reinforcing patches and other mechanisms for preventing gas leakage and improving envelope integrity and strength. The second embodiment for attaching the payload-carrying loop tabs requires only one slit (not shown) in the envelope per loop tab 25. Both ends of a single loop tab 25 are fed through the same slit and bonded to the internal envelope surface 16. There are multiple layers of reinforcing patches 24 located between the lower load curtain attachment point 13 and the envelope 15. Further, based on design preferences or parameters, gas seals 17 and/or scrims 19 may be employed to further increase the structural integrity of the envelope.

Tubes comprised of a light, strong alloy or a comparable material are shaped to the outer profile of the envelope 15 and welded together to form a frame 27 which is attached along its length to the loop tabs 25 using cord 29 tied in a secure pattern (e.g., herringbone) to evenly distribute the payload. The cord may be of any suitable material such as polyester, or the like.

The invention also contemplates two separate embodiments for attaching the frame 27 to the loop tabs 25. In a first embodiment, illustrated in FIG. 2a, the tubes of the frame do not actually fit into the loop tabs but rather, hang below the loop tabs via the cord 29 tied in for example, a herringbone pattern. In a second embodiment, the tubes themselves actually are fitted through the loop tabs, as shown in FIG. 2b. Prior to attaching the frame 27 to the envelope 15 via the loop tabs 25, several car hard points are fabricated into the frame such that the car may be fixed to the frame through suitable mechanical fasteners. Hard points and suitable mechanical fasteners, as well as methods for forming hard points are known to those skilled in the art.

The catenary system described herein overcomes many of the disadvantages of the conventional suspension systems. Since the cables between the two sets of load curtains do not breach the airship envelope, the chances of gas leakage are significantly reduced. The slits in the envelope surface are quite small compared to the openings necessary to accommodate the cables in a conventional internal catenary system. These slits are further reinforced with internal and/or external patches for added gas leakage protection and structural support. Thus, the totally internal cable portion of the novel catenary system contemplated by the invention is much simpler than existing designs and, consequently, requires minimal maintenance.

Also, the attachment of the car to the envelope is simplified and alignment is not as critical due to the use of the frame. The frame spreads the attached car's payload evenly throughout the car structure, thus relieving the high stresses conventionally found at the car hard points. The rigging of the car to the envelope is further simplified, since no cable tensioning devices are required during the assembly process.

While the embodiments described above are discussed with reference to a non-rigid airship utilizing the conventional three ballonet internal system (i.e., central helium ballonet, front and rear air ballonets), the suspension systems are applicable to variations on the non-rigid three ballonet system as well as to numerous semi-rigid airship designs. Additionally, the embodiments set forth above are intended to be only representative and are not intended to be limiting.

We claim:

1. A system for suspending a payload from an airship comprising:
a cable system comprising at least two cables, at least two upper load curtains fixed to an internal surface of an airship envelope, and at least one lower load curtain fixed to an internal surface of an airship envelope, wherein the at least two cables connect the at least two upper load curtains to the at least one lower load curtain;
at least one loop tab attached to the airship envelope; and
a frame fixed to the at least one loop tab for attaching the payload thereto.

2. The system for suspending a payload from an airship according to claim 1, wherein the at least one loop tab is attached to an internal surface of the airship envelope via at least one slit in the airship envelope.

3. The system for suspending a payload from an airship according to claim 2, wherein reinforcing patches are fixed to an external surface of the airship envelope in the area of the at least one slit for reinforcing the at least one slit.

4. The system for suspending a payload from an airship according to claim 2, wherein at least one reinforcing patch is fixed to an internal surface of the airship envelope in the area of the at least one slit for reinforcing the at least one slit.

5. The system for suspending a payload from an airship according to claim 1, wherein the frame is fixed to the at least one loop tab via a cord.

6. The system for suspending a payload from an airship according to claim 5, wherein the cord is tied between the at least one loop tab and the frame in a herringbone pattern.

7. The system for suspending a payload from an airship according to claim 1, wherein the frame is threaded through the at least one loop tab.

8. A system for suspending a payload from an airship comprising:
an internal cable system comprising at least two cables, at least two upper load curtains fixed to an internal surface of an airship envelope, and at least one lower load curtain fixed to an internal surface of an airship envelope wherein the at least two cables connect the at least two upper load curtains to the at least one lower load curtain;
at least one loop tab attached to the airship envelope through at least one slit in the airship envelope, the at least one loop tab being positioned adjacent to the points where the at least one lower load curtain attaches to the internal surface of the airship envelope; and
a frame attached to the at least one loop tab for further attaching thereto the payload.

9. The system for suspending a payload from an airship according to claim 8, wherein at least one reinforcing patch is fixed to an external surface of the airship envelope in the area of the slits.

10. The system for suspending a payload from an airship according to claim 8, wherein at least one reinforcing patch is fixed to the internal surface of the airship envelope in the area of the slits.

11. The system for suspending a payload from an airship according to claim 8, wherein the frame is fixed to the at least one loop tab via a cord.

12. The system for suspending a payload from an airship according to claim 11, wherein the cord is tied between the at least one loop tab and the frame in a herringbone pattern.

13. The system for suspending a payload from an airship according to claim 8, wherein the frame is threaded through the at least one loop tab.

14. The system for suspending a payload from an airship according to claim 8, wherein the at least one loop tab is comprised of two ends and the two ends are fed through the at least one slit and bonded to the internal surface of the airship envelope.

15. A method for suspending a payload from an airship comprising:
attaching at least two cables to an inside surface of an airship envelope surface via at least one upper and at least one lower internally fixed load curtains;
attaching at least one loop tab to an airship envelope;
attaching a frame to the at least one loop tab; and
affixing the airship payload to the frame.

16. A method for suspending a payload from an airship according to claim 15, further comprising:
- cutting at least one slit into the airship envelope for attaching the at least one loop tab thereto;
- inserting ends of the at least one loop tab through the at least one slit; and
- fixing the ends of the at least one loop tab to the internal envelope surface of the airship.

17. A method for suspending a payload from an airship according to claim 16, further comprising fixing at least one reinforcing patch to the internal envelope surface in the area where the at least one slit is to be located, prior to cutting the at least one slit in the envelope.

18. A method for suspending a payload from an airship according to claim 16, further comprising fixing at least one reinforcing patch to the external envelope surface in the area where the at least one slit is to be located, prior to cutting the at least one slit in the envelope.

19. A method for suspending a payload from an airship according to claim 15, wherein attaching the frame to the at least one loop tab comprises tying the frame to the at least one loop tab via a cord.

20. A method for suspending a payload from an airship according to claim 19, wherein the cord is tied between the at least one loop tab and the frame in a herringbone pattern.

21. A method for suspending a payload from an airship according to claim 15, wherein attaching the frame to the at least one loop tab comprises threading the frame through the at least one loop tab.

22. A payload suspension for an airship having an envelope comprising:
- at least two upper load curtains attached to the top internal surface of the envelope;
- at least one lower load curtain attached to the bottom internal surface of the envelope;
- at least two cables attached between the at least two upper load curtains and the at least one lower load curtain;
- at least one loop tab fixed to the envelope; and
- a frame for carrying the payload attached to the at least one loop tab.

* * * * *